United States Patent [19]
Steil et al.

[11] Patent Number: 6,086,357
[45] Date of Patent: Jul. 11, 2000

[54] ACTUATOR FOR AN INJECTION MOLDING VALVE GATE

[75] Inventors: Frederick G. Steil, Lake Orion, Mich.; Stephen T. Tortis, Seekonk, Mass.

[73] Assignee: D-M-E Company, Madison Heights, Mich.

[21] Appl. No.: 09/217,295

[22] Filed: Dec. 21, 1998

[51] Int. Cl.[7] ............................................. B29C 45/23
[52] U.S. Cl. .................................... 425/564; 425/566
[58] Field of Search ................................. 425/562, 563, 425/564, 565, 566

[56] References Cited

U.S. PATENT DOCUMENTS

| | | | |
|---|---|---|---|
| 4,095,931 | 6/1978 | Reitan | 425/564 |
| 4,212,627 | 7/1980 | Gellert | 425/564 |
| 4,449,915 | 5/1984 | van den Brink | 425/564 |
| 4,919,606 | 4/1990 | Gellert | 425/564 |
| 5,067,893 | 11/1991 | Osuna-Diaz | 425/564 |
| 5,670,190 | 9/1997 | Osuna-Diaz | 425/564 |
| 5,984,661 | 4/1990 | Vorkoper | 425/564 |

*Primary Examiner*—Tim Heitbrink
*Attorney, Agent, or Firm*—Stephen H. Friskney

[57] ABSTRACT

A valve for controlling the flow of fluent plastic material from an injection molding machine to a mold cavity. The valve includes an axially slidable valve pin that interacts with a material outlet to control flow through the valve selectively. The valve pin is actuated by an eccentric cam arrangement that positively drives the valve pin between positions where it is engaged with or disengaged from the material outlet. The cam acts on the valve pin only in an axial direction to avoid wear occasioned by side loads imposed on a valve pin.

8 Claims, 5 Drawing Sheets

ACTUATOR FOR AN INJECTION MOLDING VALVE GATE

BACKGROUND OF THE INVENTION

1. Field of the Invention

The present invention relates to apparatus for controlling the flow of plastic materials from an injection molding machine to an injection mold cavity. More particularly, the present invention relates to an improved valve gate for use in an injection molding machine, wherein the valve gate incorporates an actuator for positively operating an elongated valve pin between valve open and valve closed positions.

2. Description of the Related Art

To control flow of heated, fluent plastic material from an injection molding machine into a mold, a flow control valve is normally provided at some point between the outlet end of the barrel of the machine's injection unit and the mold cavity. Such valves, sometimes referred to as "valve gates," include a generally tubular valve body containing an elongated valve pin. The valve pin end is adapted to engage a mating valve seat at the interior of one end of the valve body to open and close an outlet opening selectively. The valve pin is moved in to or out of engagement with the valve seat by a suitable actuator.

One form of known valve and valve actuator for controlling the injection of plastic melt into a mold cavity is disclosed in U.S. Pat. No. 4,449,915, entitled "Closure System for Fluent Injection Apparatuses," issued on May 22, 1984. That patent describes a valve actuator that includes a rotary cam plate having a pair of spaced, so-called pressure areas that are each radially offset from a cam plate pivot axis. One of the pressure areas receives a cross pin that is connected with an elongated valve pin, and the other pressure area receives a cross pin of a fluid-operated actuator. Operation of the fluid actuator causes the actuator cross pin to cause the cam plate to rotate about its pivot axis, causing movement of the valve pin cross pin, and the valve pin, toward or away from a discharge opening. However, actuator structures of this type are prone to pivot breakage, and also impose undesirable side loads on the valve pin, thereby causing excessive wear.

Another form of valve actuator for a flow control valve associated with a mold in an injection molding machine is shown in U.S. Pat. No. 4,095,931, entitled "Injection Molding Machine and Method," issued on Jun. 20, 1978. The actuator shown in this patent includes a transversely mounted and transversely movable rod having a reduced diameter portion that defines a cam surface for engaging the end of a shut-off pin. This type of actuation also imposes undesirable side loads on the shutoff pin resulting in high wear along the line of contact.

Another known valve actuator for controlling the flow of fluent molding material is disclosed in U.S. Pat. No. 5,067,893, entitled "Injection Molding Apparatus with Shut Off Valve Pin Actuation System," issued on Nov. 26, 1991. The actuator shown in that patent includes a rack and pinion arrangement for shifting a valve pin between open and closed positions. The rack is provided adjacent the end of the valve pin that is spaced from the outlet opening, and the pin is moved in an axial direction by a pinion that is in engagement with the rack and that is rotated by a suitable actuation cylinder that operates through a right-angle drive. Such a valve pin drive arrangement has been found to involve excessive gear and rack tooth wear over time, along with difficulties in positively supporting the valve pin, which can result in undesirable side loads on the valve pin.

SUMMARY OF THE INVENTION

It is an object of the present invention to provide an improved valve actuator for an injection molding flow control valve, wherein actuation forces on the valve pin are confined to axial forces, and side loads on the valve pin are eliminated. It is a further object of the present invention to provide a valve actuator that provides a positive drive of the valve pin between the valve-open and the valve-close positions.

Briefly stated, in accordance with one aspect of the present invention, a valve is provided for controlling the flow of fluent plastic material to a mold cavity. The valve includes a valve housing having a material inlet and a material outlet. An elongated valve pin is axially slidably carried within the valve housing and has one end that is adapted to be engaged selectively with the material outlet to prevent flow of material through the valve and to be disengaged selectively from the material outlet to permit flow of material through the valve. A valve pin guide is carried by the valve housing and includes an opening for slidably receiving the elongated valve pin for reciprocating axial movement. A valve pin actuator is provided for moving the valve pin in a direction parallel to the valve pin axis, toward and away from the material outlet. The actuator includes a rotatable eccentric cam that cooperates with the valve in at a position spaced from the end of the pin that is adjacent the outlet.

In accordance with another aspect of the present invention, an actuator is provided for moving an elongated, axially extending valve pin adapted to engage a valve seat at the outlet. The valve pin is movable between closed and open positions relative to a valve outlet opening, for controlling the flow of a fluent through the valve outlet opening. The actuator includes a guide housing having an opening for receiving the elongated valve pin in a manner that allows the pin to reciprocate. A valve drive member is carried by the valve pin and is spaced axially along the valve pin from the end of the pin adjacent the outlet. The valve drive member is supported within the guide housing for movement in a direction parallel to the valve pin axis and is restrained by the guide housing from movement in a direction transverse to the valve pin axis. The valve drive member includes a slot extending transversely to the valve pin axis. A camshaft is rotatably supported in the guide housing and has its axis extending transversely to the valve pin axis, the camshaft including an eccentric cam member. A cam follower block is slidably carried in the transverse slot for movement transverse to the valve pin axis, the follower block including an interior cam follower surface for receiving and engaging an outer surface of the eccentric cam member. Means are provided for pivotally moving the camshaft about its axis to impart movement to the valve pin in the direction of the valve pin axis to selectively open and close the valve outlet opening.

DESCRIPTION OF THE PREFERRED EMBODIMENTS

Figure 1:
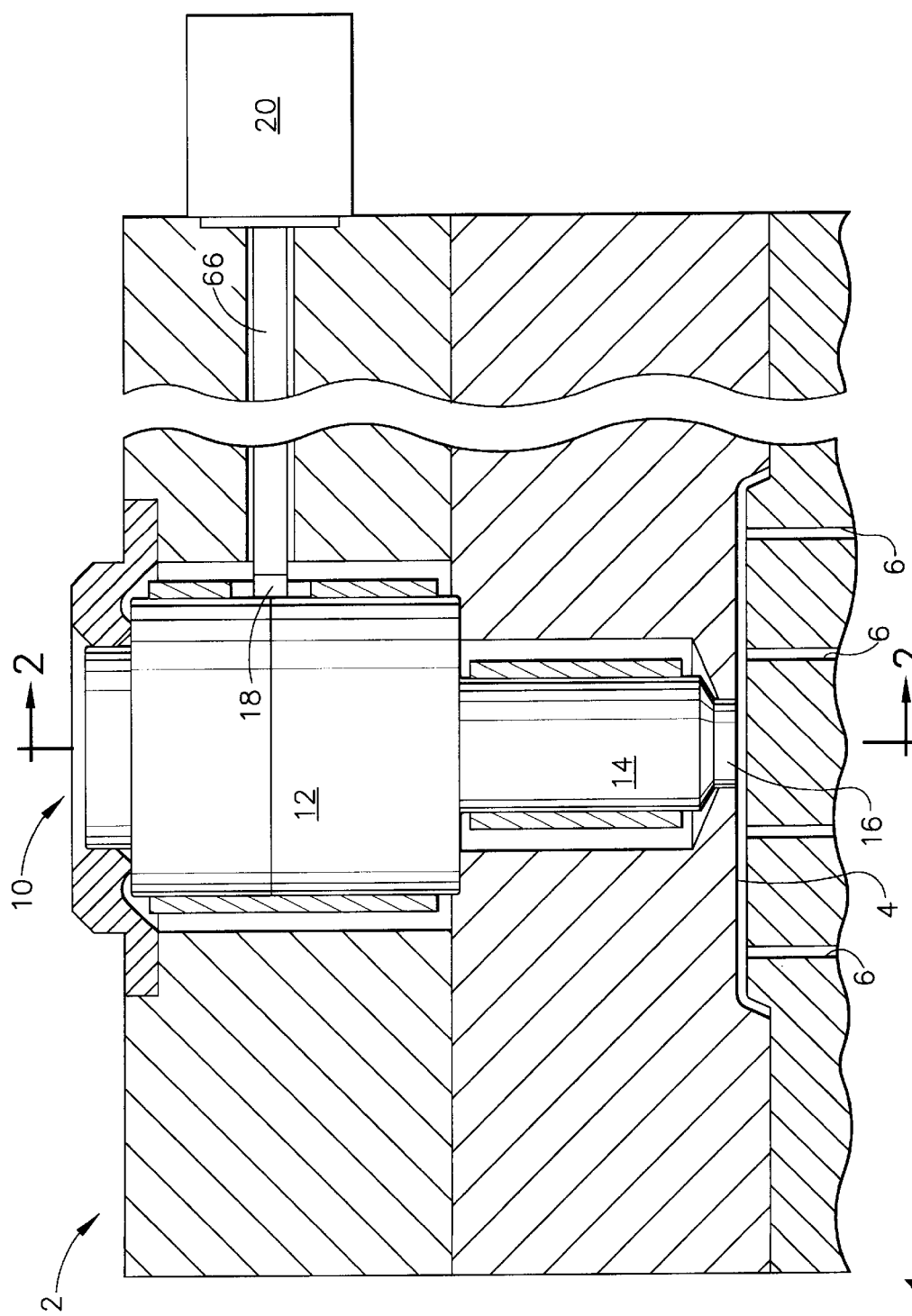
FIG. 1 is a partial cross-sectional view of an injection mold, including a flow control valve having a valve actuator in accordance with the present invention.

Referring now to the drawings, and particularly to FIG. 1 thereof, there is shown an injection mold 2 defining a mold cavity 4 and including multiple ejector rods 6, to facilitate removal of an injection molded part, as is known in the art. Immediately adjacent the mold cavity 4 is a molding material shutoff valve 10 having a valve actuator housing 12 that contains a valve actuator in accordance with the present invention. Valve 10 further includes a tubular valve body 14 having an outlet nozzle 16 that defines an outlet orifice 17. Actuator housing 12 rotatably carries and supports a camshaft 18 for moving a valve element that is contained within valve body 14. A fluid actuated, rotary motor 20 is connected to camshaft 18 to impart rotation to camshaft 18, as will be more fully described below. As an alternative to the rotary motor 20, pivotal movement can be imparted to camshaft 18 by a fluid-operated cylinder and suitable linkage (not shown), by a worm gear drive (not shown), by an electrically actuated device (not shown), or by other forms of devices known to those skilled in the art for imparting rotational movement to a shaft.

Figure 3:
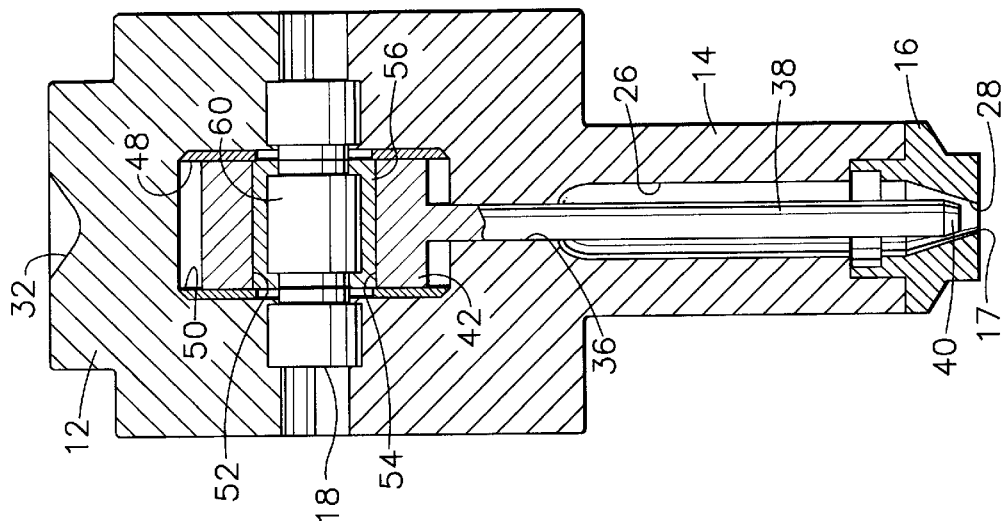
FIG. 3 is a transverse, partially cross-sectional view of the valve and actuator shown in FIG. 1, with the valve in an intermediate position.
Figure 2:
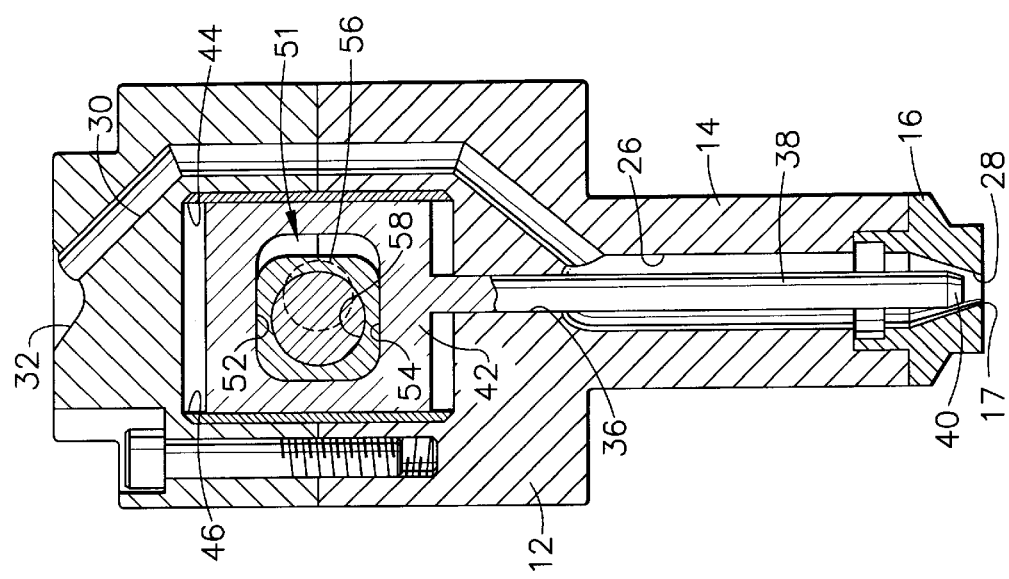
FIG. 2 is a vertical cross-sectional view of the valve and actuator shown in FIG. 1, taken along the line 2—2, with the valve in an intermediate position.
Figure 5:
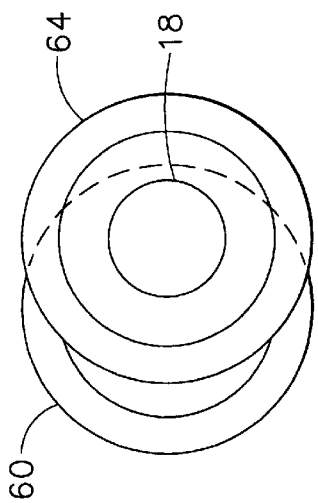
FIG. 5 is an end view of the camshaft and cam shown in FIG. 4.
Figure 4:
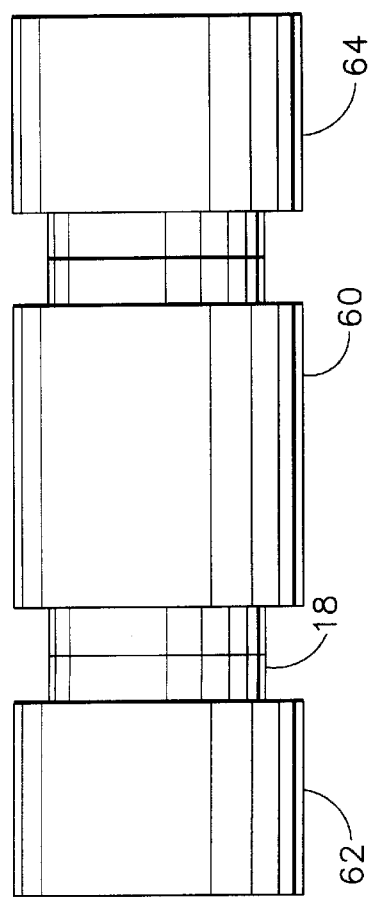
FIG. 4 is an enlarged, front view of the cam shaft and eccentric cam forming part of an actuator in accordance with the present invention, as shown in FIG. 3.
Figure 6:
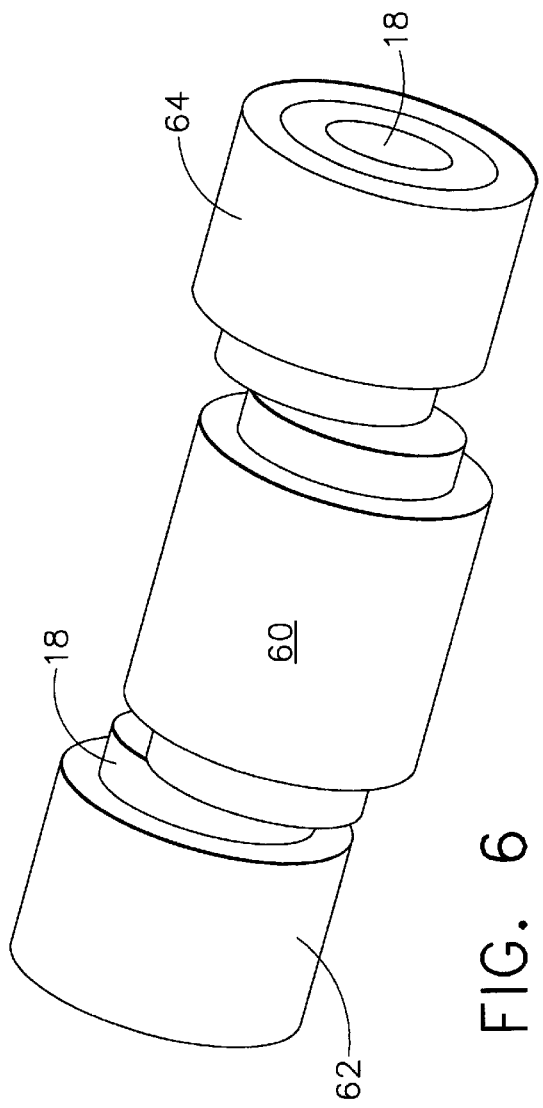
FIG. 6 is a perspective view of the camshaft and cam shown in FIG. 4.

The internal construction of the valve 10 and valve actuator 12 is shown in FIGS. 2 and 3, which are vertical and transverse cross sections, respectively, of the valve 10. The valve body 14 includes an internal flow passageway 26 for receiving fluent molding material (plastic melt) and for conveying the melt to the outlet orifice 17 of the outlet nozzle 16. As shown, the outlet nozzle 16 can be a separate member that is threadedly carried on the outermost end of the valve body 14 to facilitate removal and replacement when the valve seat 28 of the outlet nozzle 16 becomes worn, scored, or otherwise damaged. Molding material can be conveyed to the valve body 14 by a conduit 30 that extends from a molding material inlet opening 32 adapted to communicate with the injection barrel of an injection molding machine (not shown), through the actuator housing 12 and to the flow passageway 26, as shown in FIG. 2. Alternatively, molding material can be introduced directly into flow passageway 26 through a transverse material inlet (not shown) in the valve body 14, depending on the orientation and configuration of the source of plastic melt.

Actuator housing 12 is preferably a generally cylindrical member, as shown, and includes a valve pin guide aperture 36 that corresponds in cross section with the cross section of the valve pin 38. The valve pin guide aperture 36 communicates with the flow passageway 26 and serves to support the valve pin 38 as it is moved to open and close the outlet nozzle 16.

The valve pin 38 includes a valve pin drive member 42 at the end of the pin 38 that is opposite from tapered end 40. The drive member 42 is slidably carried and confined within the actuator housing 12 for linear movement in a direction aligned with the longitudinal axis of the valve pin 38. In that regard, the actuator housing 12 includes a pair of opposed, parallel, upper and lower guides surfaces 44, 46 (see FIG. 2) and a pair of opposed, parallel, right and left side guide surfaces 48, 50 (see FIG. 3), to confine slidably and to guide linearly the movement of valve pin drive member 42. An inner, transverse, guide passageway 51 extends through the drive member 42 and includes a pair of opposed, parallel, inner guide surfaces 52, 54 that are disposed perpendicular to the longitudinal axis of the valve pin 38.

Slidably carried within the guide passageway 51 is a cam follower block 56 that includes a transversely-extending, circular opening 58. The follower block 56 is carried within the guide member 51 for linear movement along and between the inner guide surfaces 52 and 54, so that the movement of the follower block 56 relative to the guide member 51 is confined to a direction perpendicular to the longitudinal axis of the valve pin 38.

Movement of the valve pin 38 in a longitudinal direction toward and away from the valve seat 28 is effected by an eccentric cam 60 that has a circular cross section and is non-rotatably carried on camshaft 18, as shown in FIGS. 2 through 6. The camshaft 18 includes a pair of axially spaced bearing surfaces 62, 64, one on either side of cam 60, for rotatably supporting the camshaft 18 in journals formed in the actuator housing 12. As best seen in FIG. 3, the camshaft 18 includes an axial extension 66 to which the motor 20 is suitably connected.

Referring once again to FIG. 2, during the injection molding process, the valve pin 38 is moved in an axial direction as a result of the rotary motor 20 causing the camshaft 18 to rotate about its axis. In other words, as the camshaft 18 turns about its own axis, the center of cam 60 traverses a circular path centered on the axis of the camshaft 18 and having a radius equal to the offset of the cam 60 from the axis of the camshaft 18. The movement of the cam 60 causes the cam follower block 56 to also move in a circular or orbital path relative to camshaft 18, but in a linear, transverse path relative to the drive member 42, since the construction of the housing 12 restricts the drive member 42 to linear movement. The guide passageway 51 in the drive member 42 is sized relative to the guide block 56, so that the horizontal component of the orbital movement of follower block 56 causes the block 56 to move horizontally along the guide surfaces 52 and 54 with respect to drive member 42, while the vertical component of the movement of block 56 is imparted to drive member 42 as vertical (linear) movement. The valve drive member 42 moves the pin 38 within the guide aperture 36 in a direction along the longitudinal axis of valve pin 38 by virtue of the confinement imposed by upper and lower guide surfaces 44, 46 and by right and left guide surfaces 48, 50 of actuator housing 12. Movement of tapered end 40 of the valve pin 38 toward and away from valve seat 28, operates to control the flow of plastic melt through outlet orifice 17 and into the mold cavity 4.

Figure 8:
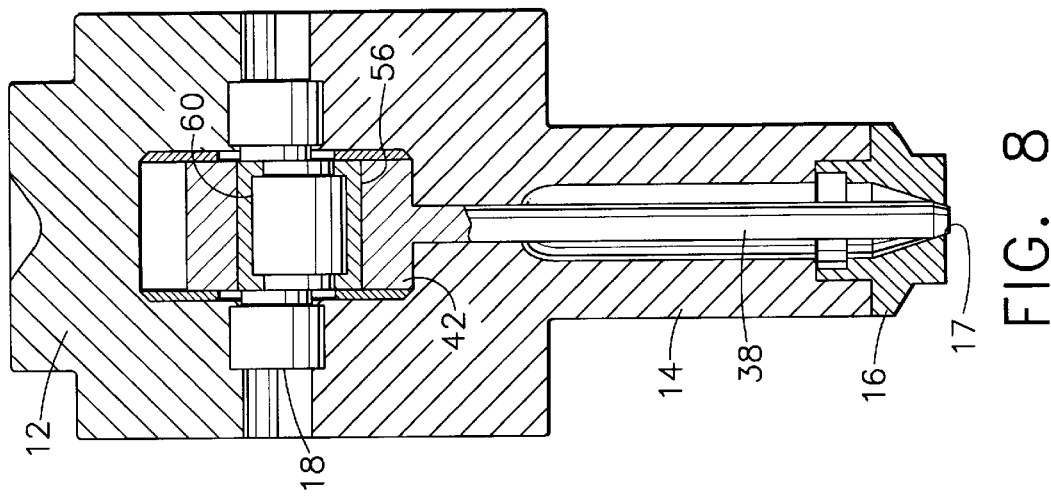
FIG. 8 is a cross-sectional view of the valve and actuator, similar to FIG. 3, with the valve in the closed position.
Figure 8A:
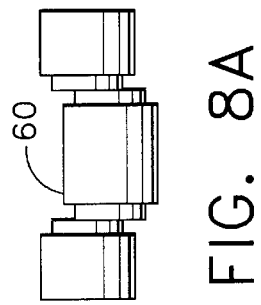
FIG. 8a is a front view of the camshaft and cam showing the orientation of the cam when the valve is in the closed position shown in FIG. 8.
Figure 7:
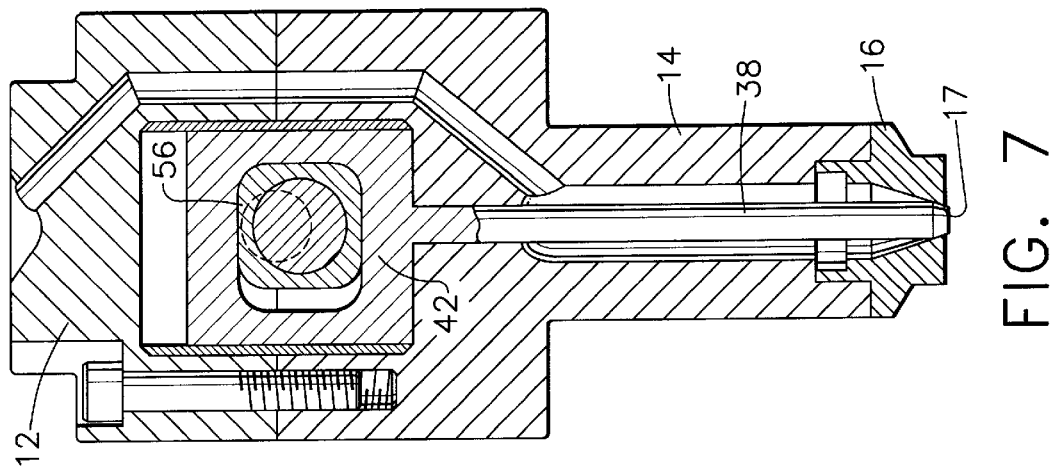
FIG. 7 is a cross-sectional view of the valve and actuator, similar to FIG. 2, with the valve in the closed position.
Figure 7A:
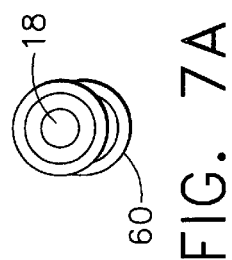
FIG. 7a is an end view of the camshaft and cam showing the orientation of the cam when the valve is in the closed position shown in FIG. 7.
Figure 10:
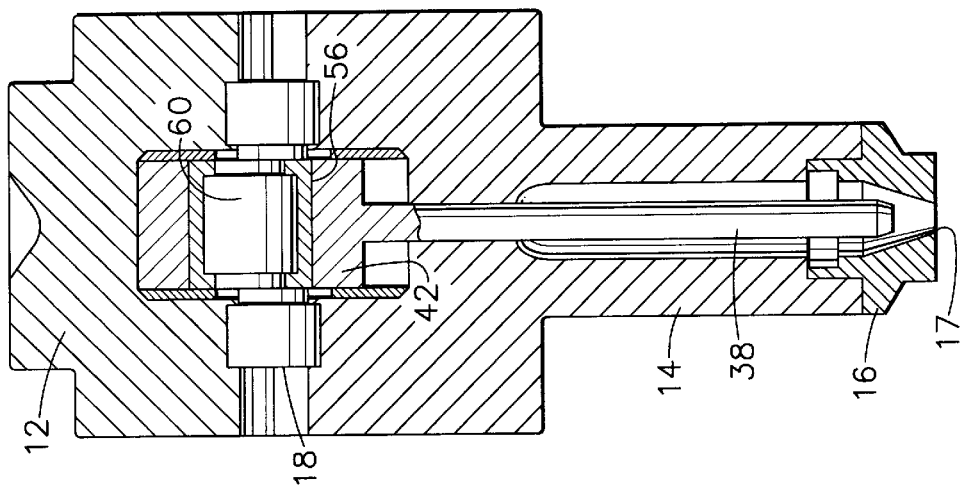
FIG. 10 is a cross-sectional view of the valve and actuator, similar to FIG. 3, with the valve in the fully open position.
Figure 10A:
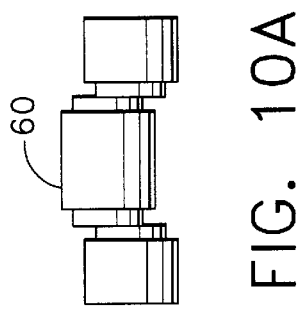
FIG. 10a is a front view of the cam shaft and cam showing the orientation of the cam when the valve is in the fully open position shown in FIG. 10.
Figure 9:
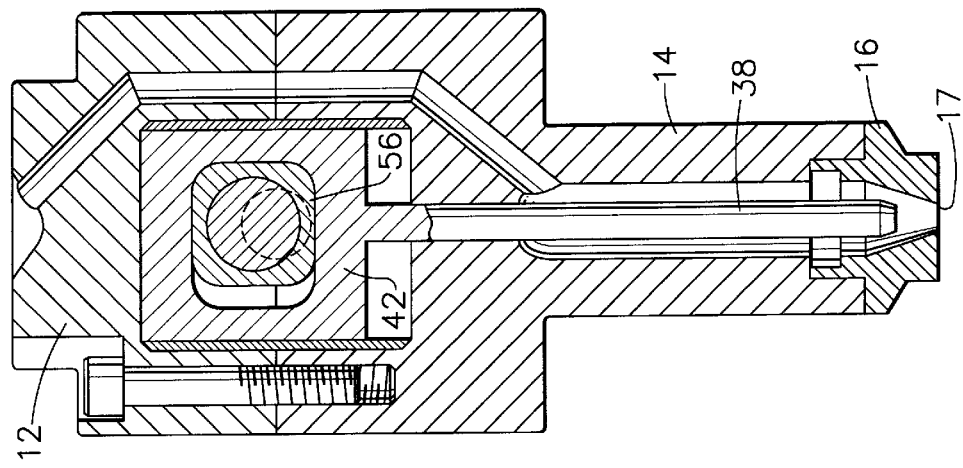
FIG. 9 is a cross-sectional view of the valve and actuator, similar to FIG. 2, with the valve in the fully open position.
Figure 9A:
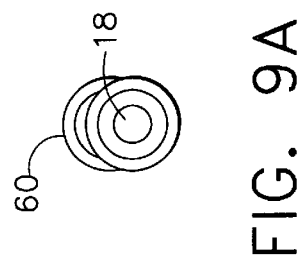
FIG. 9a is an end view of the cam shaft and cam showing the orientation of the cam when the valve is in the fully open position shown in FIG. 9.

The relative positions of the primary parts of the valve 10 at the operative points during a molding cycle are shown in FIGS. 7 through 10. In FIGS. 7 and 8, the valve 10 is shown in its closed position, with the tapered end 40 of the valve pin 38 in contact with the valve seat 28 to prevent melt from flowing through the outlet orifice 17. At that point in the operation of the valve (closed), the eccentric cam 60 and the camshaft 18 are in the position shown in FIGS. 7a and 8a, respectively. As the camshaft 18 is rotated 90 degrees in a clockwise direction, for example, the eccentric cam 60 causes the cam follower block 56 to traverse a circular arc, so that the follower block 56 is shifted laterally within the passageway 51 of the valve drive member 42. At the same time, the block 56 acts on the drive member 42 to move the pin 38 from the lower-most, closed position shown in FIGS. 7 and 8, to the intermediate, partially open position of the valve as shown in FIGS. 2 and 3.

Rotation of camshaft 18 for an additional 90 degrees in a clockwise direction, will similarly result in the eccentric cam 60 causing the cam follower block 56 to traverse another circular arc, shifting the follower block 56 back laterally within the passageway 51 of the valve drive member 42. As before, the block 56 acts on the drive member 42 in a vertical direction to move the valve pin 38 from the intermediate position shown in FIGS. 2 and 3 to the fully open position shown in FIGS. 9 and 10. The relative positions of the camshaft 18 and eccentric cam 60 that correspond with the positions of the valve parts as shown in FIGS. 7 through 10, are shown in FIGS. 7a through 10a, respectively.

It should be noted that incremental movement of the eccentric cam 60 and be used to effect partial operation of the valve pin 38, allowing the flow rate of the melt to be regulated by the nozzle; i.e. a flow control valve. If this is done during injection, it can also be used to "profile" the melt flow to the cavity.

Although particular embodiments of the present invention have been illustrated and described, it would be apparent to those skilled in the art that various changes and modification can be made without departing from the spirit of the present invention. Accordingly, it is intended to encompass within the appended claims all such changes and modifications that fall within the scope of the present invention.

What is claimed is:

1. A valve for controlling the flow of fluent plastic material to a mold cavity, said valve comprising:

a valve housing having a material inlet and a material outlet;

an elongated valve pin axially slidably carried within the valve housing, the pin having an end adjacent the material outlet and adapted to be engaged selectively with the outlet to prevent flow of material through the valve and to be disengaged selectively from the material outlet to permit flow of material through the valve;

a valve pin guide carried by the valve housing and having an opening for slidably receiving the elongated valve pin for reciprocating axial movement; and a valve pin actuator including a rotatable eccentric cam that cooperates with the valve pin at a position spaced from the end adjacent the outlet, for moving the valve pin in a direction parallel to the valve pin axis toward and away from the material outlet.

2. A valve in accordance with claim 1, including a valve drive member carried by the valve pin and spaced axially along the valve pin from the end adjacent the outlet, the valve drive member supported for linear movement in a direction parallel to the valve pin axis and restrained by the valve pin guide from movement in a direction transverse to the valve pin axis.

3. A valve in accordance with claim 2, wherein the valve drive member includes a passageway extending transversely to the valve pin axis.

4. A valve in accordance with claim 3, including a cam follower block slidably carried in the passageway of the valve drive member for movement transverse to the valve pin axis, the cam follower block including an interior cam follower surface for receiving and engaging an outer surface of the eccentric cam.

5. A valve in accordance with claim 1, wherein the rotatable eccentric cam is carried on a camshaft rotatably supported in the housing and having its axis extending transversely to the valve pin axis.

6. A valve in accordance with claim 2, wherein the housing includes guide surfaces that extend parallel with the valve pin axis for guiding the valve drive member as it moves toward and away from the material outlet.

7. A valve in accordance with claim 4, wherein the cam is engaged with the cam follower for moving the valve drive member in a first direction and in a second direction that is opposite from the first direction.

8. A valve for controlling the flow of fluent plastic material from an injection molding machine to a mold cavity, said valve comprising:

a valve housing having a material inlet and a material outlet;

an elongated valve pin slidably carried within the valve housing, the pin having an end adjacent the material outlet and adapted to be engaged selectively with the material outlet to prevent flow of material through the valve, and to be disengaged selectively from the material outlet to permit flow of material through the valve;

a valve pin guide carried by the housing and having an opening for slidably receiving the elongated valve pin for reciprocating axial movement;

a valve drive member carried by the valve pin and spaced axially along the valve pin from the end adjacent the outlet, the valve drive member supported for linear movement in a direction parallel to the valve pin axis and restrained by the valve pin guide from movement in a direction transverse to the valve pin axis, the valve drive member including a passageway extending transversely to the valve pin axis;

a camshaft rotatably supported in the guide housing and having its axis extending transversely to the valve pin axis, the camshaft including an eccentric cam member;

a cam follower block slidably carried in the passageway of the valve drive member for movement transverse to the valve pin axis, the cam follower block including an interior cam follower surface for receiving and engaging an outer surface of the eccentric cam member; and means for rotating the camshaft about its axis to impart movement to the valve pin in the direction parallel to the valve pin axis to open and close the valve outlet selectively.

\* \* \* \* \*